United States Patent [19]
Sugimoto

[11] Patent Number: 5,536,403
[45] Date of Patent: Jul. 16, 1996

[54] LIQUID PURIFICATION SYSTEM WITH MICROFILTRATION MEANS, DISINFECTION MEANS AND ADSORPTION MEANS

[76] Inventor: Akitoshi Sugimoto, 244, Mama, Kochi-shi, Kochi, Japan

[21] Appl. No.: 275,130

[22] Filed: Jul. 14, 1994

[30] Foreign Application Priority Data

Jul. 16, 1993 [JP] Japan ................................. 5-176917

[51] Int. Cl.$^6$ ................................................. B01D 15/04
[52] U.S. Cl. ..................... 210/256; 210/259; 210/287; 210/338; 210/342
[58] Field of Search ................................. 210/169, 194, 210/196, 243, 256, 264, 287, 315, 317, 342, 258, 259, 260, 261, 266, 337, 338

[56] References Cited

U.S. PATENT DOCUMENTS

| | | | |
|---|---|---|---|
| 3,347,211 | 10/1967 | Falkenberg et al. | 210/169 |
| 4,151,092 | 4/1979 | Grimm et al. | 210/256 |
| 4,752,401 | 6/1988 | Bodenstein | 210/169 |
| 4,959,142 | 9/1990 | Dempo . | |
| 4,971,687 | 11/1990 | Anderson | 210/256 |
| 5,078,876 | 1/1992 | Whittier et al. | 210/317 |
| 5,106,501 | 4/1992 | Yang et al. | 210/315 |
| 5,108,594 | 4/1992 | Giovanetti et al. | 210/169 |
| 5,236,595 | 8/1993 | Wang et al. | 210/258 |
| 5,244,585 | 9/1993 | Sugimoto . | |
| 5,252,206 | 10/1993 | Gonzalez | 210/315 |

FOREIGN PATENT DOCUMENTS

| | | |
|---|---|---|
| 0494334 | 7/1992 | European Pat. Off. . |
| 0531817 | 3/1993 | European Pat. Off. . |
| 2754488 | 6/1979 | Germany . |

*Primary Examiner*—W. L. Walker
*Attorney, Agent, or Firm*—Young & Thompson

[57] ABSTRACT

The liquid purification system of the present invention has a double-tank structure comprising an inner tank and an outer tank that are in communication with one another so that either one of the microfiltration means and the adsorption means may be accommodated is in the inner tank, and the microfiltration means or the adsorption means that is not accommodated in the inner tank may be accommodated in the outer tank, with the disinfection system being provided on the liquid line connecting the inner and the outer tanks. Since the liquid purification system of the present invention has such an arrangement, the system is quite compact in size to facilitate an easy installation and maintenance at low cost while the system satisfies various performances required for the system used for the purification by filtration, disinfection and adsorption of pool water; drinking water and beverages; industrial water; waste water; rain water and water from river, lake or sea; and the like. It should also be noted that the liquid purification system of the present invention may be assembled by using porous ceramic filters of commercially available dimension.

8 Claims, 7 Drawing Sheets

(a)

(b)

5,536,403

LIQUID PURIFICATION SYSTEM WITH MICROFILTRATION MEANS, DISINFECTION MEANS AND ADSORPTION MEANS

BACKGROUND OF THE INVENTION

This invention relates to a liquid purification system. More particularly, this invention relates to a system for purifying a liquid such as pool water that is compact in size and readily installable, and at the same time, that is capable of purifying a large volume of liquid at a high purification level.

Various filtration systems have been proposed and actually put in use in the production of drinking water where water from river, lake, sea or drainage are purified. In such system, a porous ceramic filter is often employed for the filtration to remove various impurities and malodor contaminants that are unsuitable for drinking water. Various water purification systems for well or city water are also commercially available wherein a porous ceramic filter is utilized to remove the small amount of organic and inorganic substances present in the water that are responsible for the offensive odor and the poor taste.

Porous ceramic filters are also employed in the fermentation of beer, wine, sake, soy sauce, and the like, where solids and impurities should be removed from the fermentation products; and in the production of sauce, beverage, fruit juice, edible oil, and the like, wherein removal of solids and impurities are also required in their production. Since the drinking water, the liquors, the beverages, fruit juices, sauces, and cooking oils as mentioned above are to be taken in by drinking or eating, severe requirements are imposed on the systems used for their purification. Such systems are also required to have a large capacity in the case of an industrial scale production.

With the deepening concern for pollution, strict regulations have been established to control the quality of waste water from factories, and the water purification systems used for such purpose are required to have a higher performance as well as a larger capacity. In near future, waste waters from other businesses, schools, and facilities as well as waste water from home will be subject to such regulations. Accordingly, there are growing demands for various types of high-performance, low-cost water purification systems ranging from a small size to a large size.

Also, with the growing concern for physical fitness, many people nowadays prefer swimming as an exercise involving whole body that may promote their health and relieve physical stress. Accordingly, an increasing population, irrespective of their age or sex, often goes swimming in pools.

To allow such people enjoy swimming under safe and clean conditions, pools must be kept clean, particularly in terms of their water quality. In view of such a situation, severer requirements are imposed on the water purification system that determine the quality of the pool water, and there are growing demands for a higher-performance water purification system, which generally results in an enlarged size of the system.

The pool water purification system, which is a typical liquid purification system, may generally comprise a pre-filtration unit for removing dirt, hair and other coarse impurities generally present in the pool water; a filtration unit; an adsorption unit, and a disinfection unit for sterilizing the pool water. Such a purification system may optionally comprise a unit for supplying a filter aid to the filtration system; a heat exchanger unit to elevate the temperature of the pool water in the case of a heated swimming pool; and the like. The pool water generally circulates between the pool and the water purification system, and the water is thereby purified with the water quality being maintained at a hygienically acceptable level.

In view of such situation, a porous ceramic filter is frequently employed in the filtration unit of the water purification system, since the porous ceramic filter is abundant in minute three-dimensional filtration spaces suitable for trapping oils and other organic substances that are secreted from human body that are present in the water from heated swimming pool, and that could not be removed by conventional filters.

Installation of the water purification system may desirably be completed in a short period. In the case of building a new pool, there are many works to done besides the building of the pool itself, and installation of the water purification system should be completed as early as possible so as not to conflict with other works.

Situation is the same in the replacement of pool water purification system that is already in use with a new one. In particular, in the case of a heated swimming pool that is open throughout the year, the installation of the water purification system should be completed as early as possible in order to shorten the closure period.

In spite of such situation, installation of the water purification system is rather troublesome. First, the large size of the pool water purification system, and in particular, of the system with a high water purification performance is likely to induce various troubles in the transportation.

In addition, such water purification system is generally installed in a relatively small space together with the complicated lines connecting all the filtration, disinfection, adsorption and other units.

Furthermore, the machines and the devices such as a crane and a hoist that can be used for the installation of the water purification system at the installation site are limited.

As described above, installation of the water purification system at the installation site is quite troublesome and may take a considerable period.

The situation is similar for the installation of other liquid purification systems used for drinking water, liquors, beverages and sauces. Accordingly, there is a strong demand for a liquid purification system utilizing a porous ceramic filter that is compact in size, and that has a high liquid purification performance.

SUMMARY OF THE INVENTION

An object of the present invention is to obviate the above-described problems of the conventional liquid purification systems and provide a liquid purification system with a satisfactory liquid purification performance, namely, a satisfactory filtration, adsorption and disinfection performances.

Another object of the present invention is to provide an inexpensive liquid purification system that is compact in size to enable a convenient installation.

To attain such objects, there is provided in accordance with the present invention, a system for purifying a liquid by a microfiltration means, a disinfection means, and an adsorption means, comprising an inner tank surrounded by an inner cylindrical side wall, said inner tank having accommodated therein one of said microfiltration means and said adsorption means;

an outer tank defined between said inner cylindrical side wall of said inner tank and an exterior cylindrical side wall concentrically surrounding said cylindrical wall of said inner tank, said outer tank having accommodated therein one of said microfiltration means and said adsorption means that is not accommodated in said inner tank; and a fluid line connecting said microfiltration means and said adsorption means, said fluid line having provided thereon said disinfection means.

The liquid purification system may preferably further comprise an ultrafiltration means that is provided between said microfiltration means and said disinfection means.

The liquid purified in the liquid purification system may preferably pool water.

The disinfection means may preferably be arranged in said outer tank at its top or bottom portion where said one of said microfiltration means and said adsorption means is not accommodated and/or in the fluid line connecting said microfiltration means and said adsorption means in the exterior of said tank.

The microfiltration means may preferably utilize a cylindrical porous ceramic filter for the filtration, and the adsorption means may preferably utilize activated carbon as at least one means for the adsorption. The disinfection means may preferably utilize ultraviolet ray as at least one means for the disinfection.

The porous ceramic filter may preferably be a hollow cylindrical porous ceramic filter having an exterior surface and an interior surface, wherein a central through hole is axially defined by the interior surface, and a plurality of circumferentially aligned through holes are axially bored through said cylindrical filter in the cylindrical portion between said exterior and said interior surfaces. In such a porous ceramic filter, the liquid to be filtered may preferably flow outside the cylindrical filter along said exterior surface and inside the cylindrical filter through said central through hole along said interior surface, and the liquid that has been filtered through said cylindrical filter may flow through the plurality of through holes bored through the cylindrical portion between said exterior and said interior surfaces.

BRIEF DESCRIPTION OF THE DRAWINGS

FIG. 4 (b) is a vertical cross sectional view of the upper end of the filter assembly shown in FIG. 4 (a).

FIG. 5 (d) is a transverse cross sectional view of the filter assembly of FIG. 4(a) taken along lines A—A.

Figure 5:
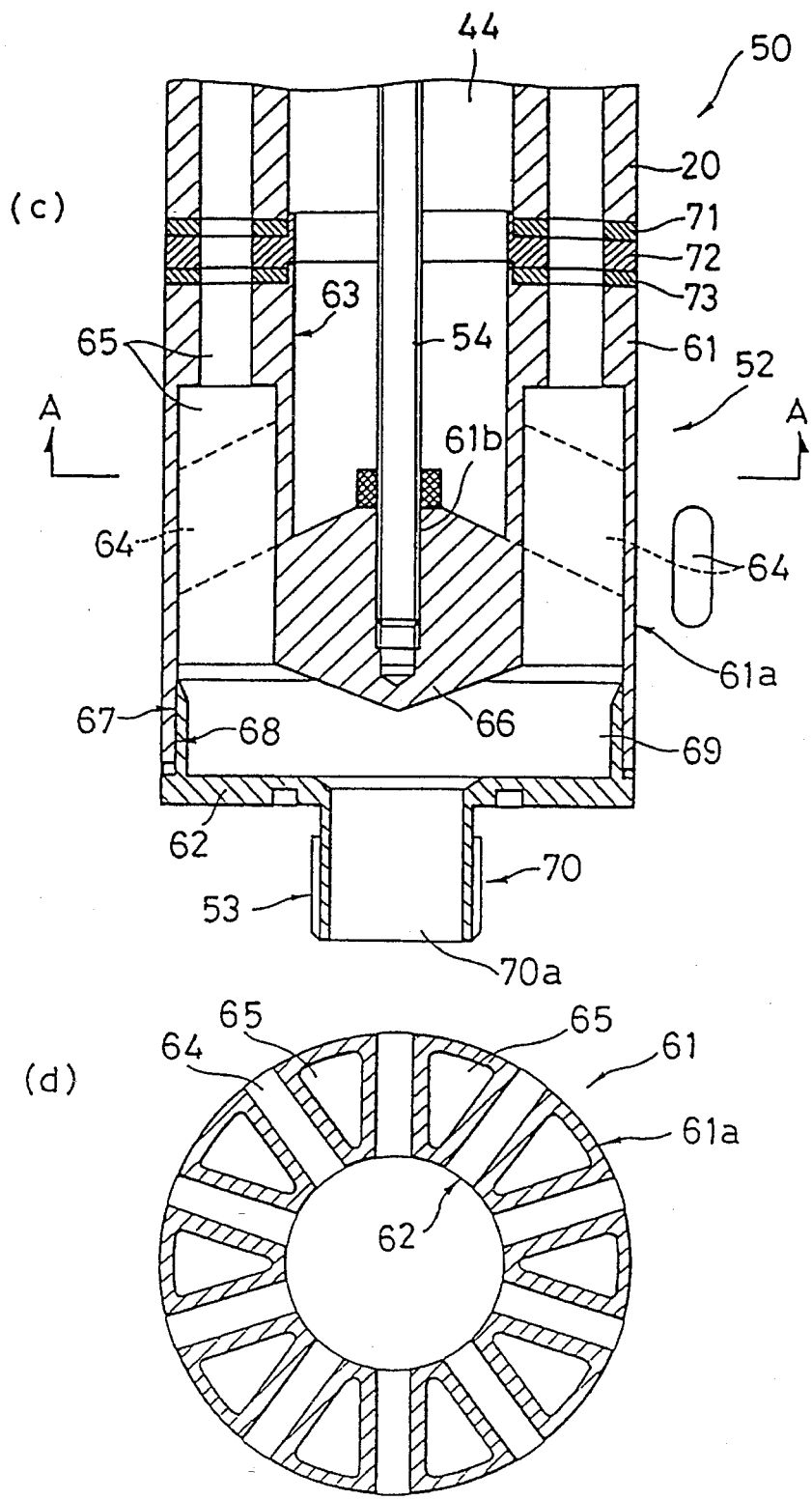
FIG. 5 (c) is a vertical cross sectional view of the lower end of an embodiment of the filter assembly used in the liquid purification system of the present invention.

No FIGS. 5(a) and 5(b) exist.

Figure 6:
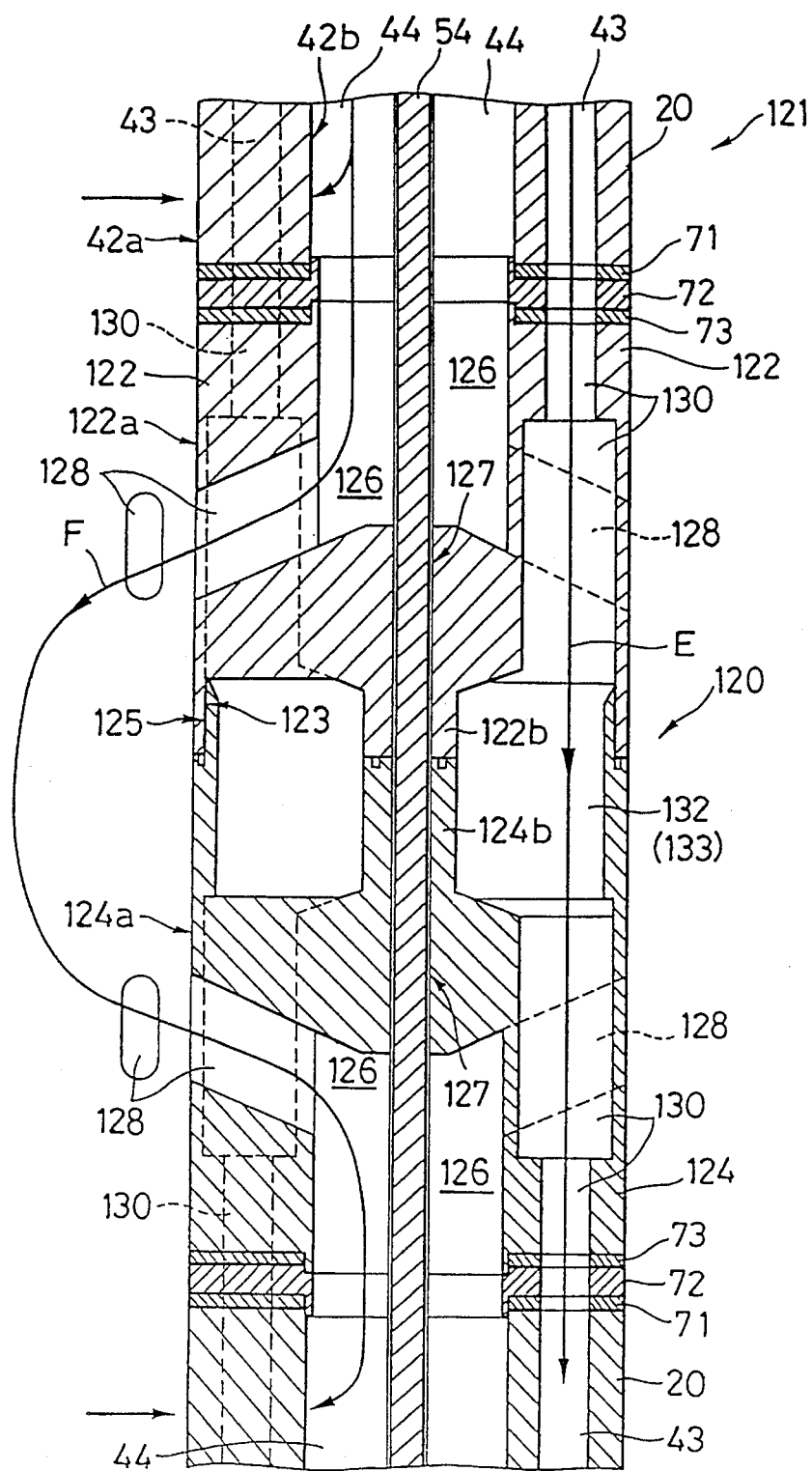

FIG. 6 is a vertical cross sectional view of the intermediate portion of an embodiment of the filter assembly used in the liquid purification system of the present invention.

Figure 7:
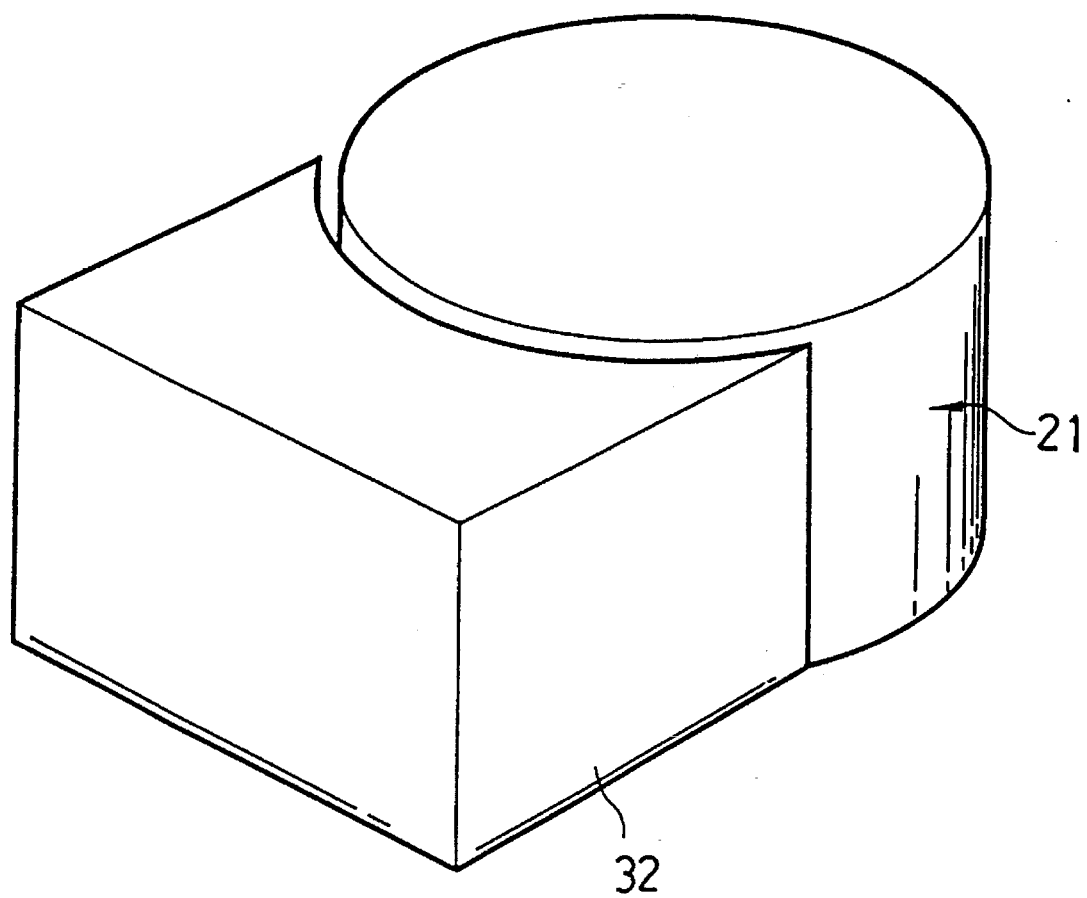

FIG. 7 is a schematic perspective view of a preferable embodiment of the filter aid supplying means.

DETAILED DESCRIPTION OF THE INVENTION

In the liquid purification system of the present invention, a liquid such as pool water is purified by a microfiltration means, a disinfection means, and an adsorption means. In the purification system of the present invention, these purification means are arranged in an inner and outer tanks that are in fluid communication with one another. The inner tank is surrounded by a cylindrical side wall, and the outer tank is defined between said inner cylindrical side wall of said inner tank and an exterior cylindrical said side wall concentrically surrounding said cylindrical wall of said inner tank. Either one of the microfiltration means and the adsorption means is accommodated in the inner tank, and the microfiltration means or the adsorption means that is not accommodated in the inner tank is accommodated in the outer tank. The disinfection means is provided on a fluid line connecting the microfiltration means and the adsorption means.

As described above, the liquid purification system of the present invention has adopted a double tank structure to arrange the microfiltration means, the disinfection means, and the adsorption means in one unit by accommodating one of the filter means and the adsorption means in the inner tank, accommodating one of the filter means and the adsorption means that is not accommodated in the inner tank in the outer tank, and providing the disinfection means on the fluid line connecting the microfiltration means and the adsorption means. Compared to the conventional liquid purification systems wherein such means are separately arranged, the liquid purification system of the present invention is far more compact in size to enable a convenient installation in a short period. In spite of such compactness, the system of the present invention is comparable to conventional systems in its liquid purification performance to fulfill a satisfactory removal of the impurities as well as a sufficient disinfection.

In the present invention, a cylindrical porous ceramic filter is utilized in the microfiltration means, and activated carbon is utilized as at least one means of adsorption in the adsorption means. The disinfection means of the present invention utilizes ultraviolet ray as at least one means for the disinfection optionally combined with an ozone-generator. Such combination of efficient means realizes the high purification performance of the present invention.

Use of such a cylindrical porous ceramic filter is particularly effective in the miniaturization of the system while maintaining the purification capacity at the required level. Although the configuration of the cylindrical porous filter is not limited to any particular type, the most preferred is the type having a plurality of circumferentially aligned through holes axially bored through the cylindrical body between the interior and the exterior surfaces of the hollow cylindrical filter so that the liquid before the filtration may flow along the interior and exterior surfaces of the cylindrical body and the purified liquid may flow within the plurality of through holes axially extending through the cylindrical body.

The liquid purification system of the present invention is hereinafter described in further detail by referring to the preferred embodiment shown in the attached drawings. In this embodiment, the liquid purified is pool water. The liquid, however, is not limited to the one purified in the preferred embodiment.

Figure 1:
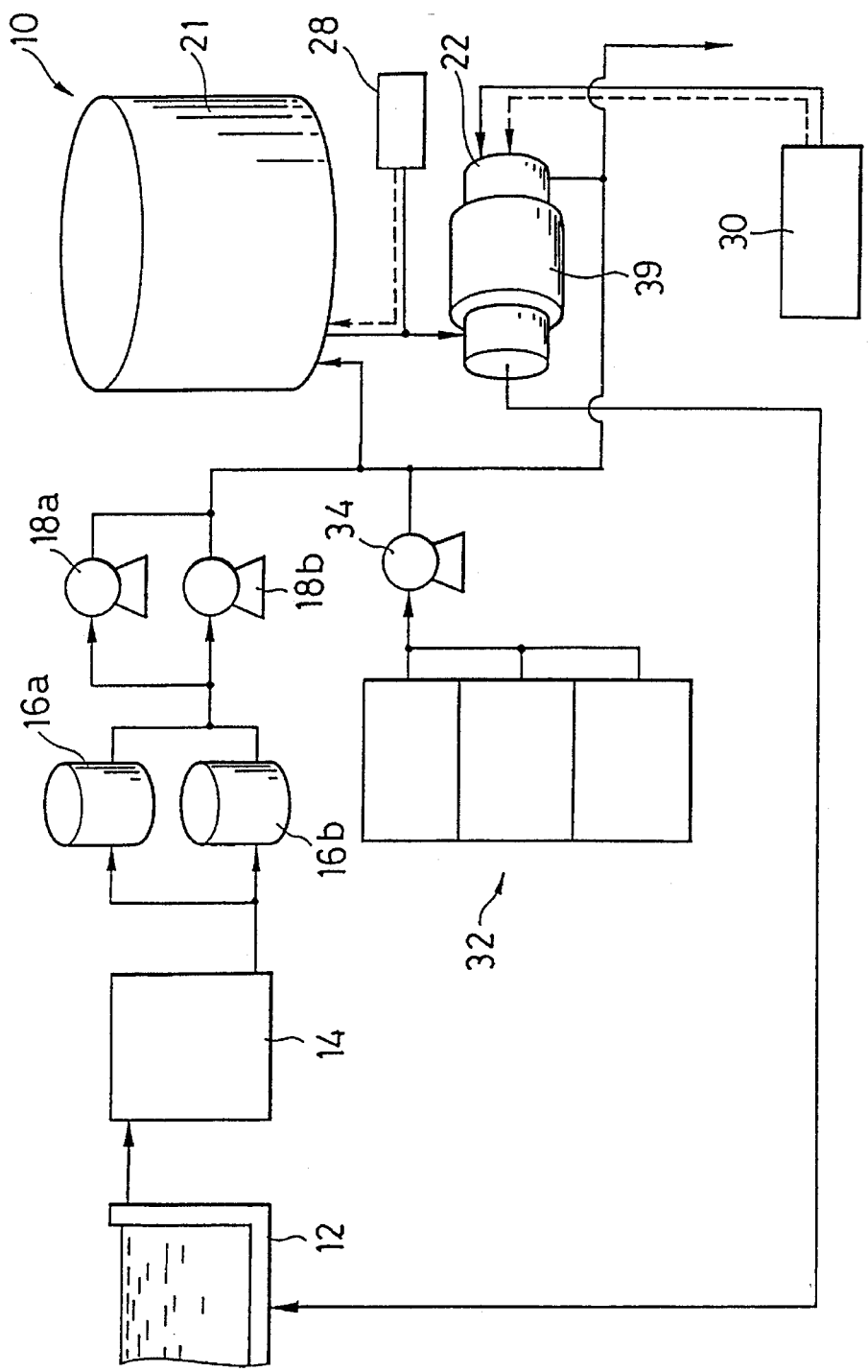
FIG. 1 is a schematic view of a pool water purification plant wherein the liquid purification system of the present invention is incorporated.

FIG. 1 schematically illustrates a typical construction of pool water purification plant wherein the liquid purification system of the present invention is incorporated to purify the water in a pool 12.

The system shown in FIG. 1 comprises an overflow tank 14 in which the water that had overflown the pool 12 is pooled; prefilters 16a and 16b; pool water circulating pumps 18a and 18b, the liquid purification system 10 of the present invention; an ultrafiltration means 22; a backwash means 28 for the liquid purification system 10; a backwash means 30 for the ultrafiltration means 22; a filter aid supplying means 32; and a slurry pump 34.

FIG. 1 only illustrates a typical basic constitution of the water purification plant in which the liquid purification system of the present invention is incorporated, and it should be taken for granted that the system shown in FIG. 1 is also provided with various tanks generally used in such purification system, such as tanks accommodating chlorine, alkaline and the like; valves; pipe lines; heat exchangers; and the like.

The overflow tank 14 temporarily stores the water that had overflown the pool 12 or the water drained from the pool 12 under gravity or by a pump or some other means. The pool water stored in the overflow tank 14 flows through a pipeline to the prefilters 16a and 16b at a predetermined rate.

The prefilters 16a and 16b are packed with filter media such as carbon filters and removes hair, threads, yarns, adhesive tapes, dust, and other coarse impurities that are contained or suspended in the drained pool water sent from the overflow tank 14. Removal of the coarse impurities by the prefilters 16a and 16b enables smooth purification of the pool water in the subsequent liquid purification system 10 of the present invention wherein the pool water is further treated by porous ceramic filters 20 which will be described in detail. More than one unit of the prefiltration means may be provided in the plant.

The pumps 18a and 18b are circulating pumps and may be of any type that imparts sufficient energy to force the pool water to flow though the purification system 10. The number of the pump used is not limited; one pump unit may be used, or alternatively, a plurality of pump units may be arranged in series or in parallel to one another.

The pool water from the water circulation pumps 18a and 18b is then purified by the liquid purification system 10 of the present invention by a microfiltration means 84, a disinfection means 90 and an adsorption means 86.

Figure 2:
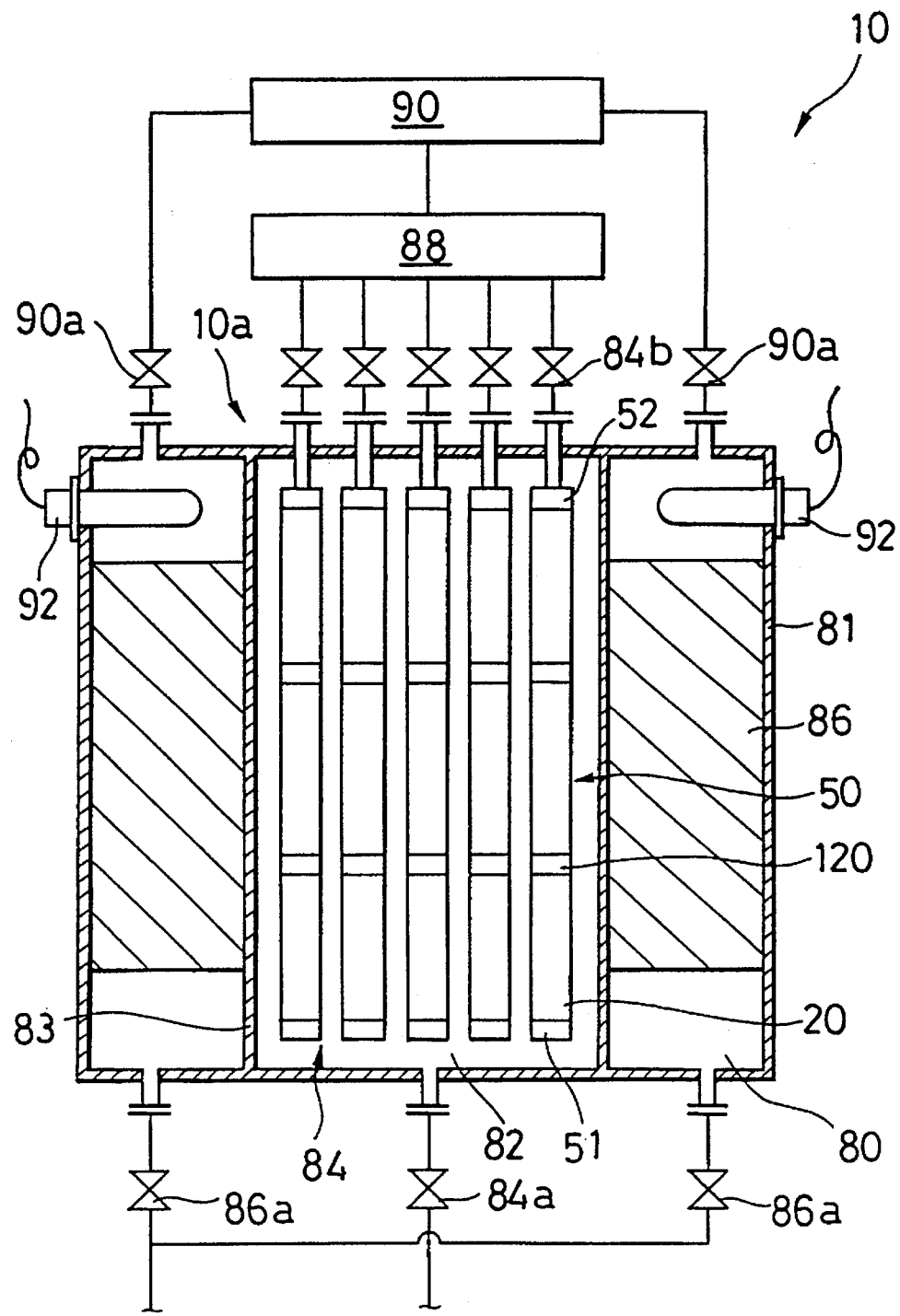
FIG. 2 is a schematic cross sectional view of an embodiment of the liquid purification system of the present invention.

FIG. 2 is a schematic cross sectional view of an embodiment of the liquid purification system 10. As shown in FIG. 2, the purification system 10 comprises a system body 10a with a double tank structure closed in its upper and lower ends; and a liquid collection means 88; and a disinfection means 90. The double tank structure of the system body 10a is constituted by an outer casing or tank 80 defined by an outer cylindrical side wall 81, a lid, a bottom, and an inner cylindrical side wall or partition 83 concentrically surrounded by the outer cylindrical side wall 81 of the outer tank. An inner tank 82 is defined by the inner cylindrical partition 83, the lid and the bottom.

In this embodiment, the inner tank 82 accommodates the microfiltration means 84, and the outer tank 80 accommodates the adsorption means 86 as well as an ultraviolet lamp 92 that constitutes the disinfection means 90.

The pool water from the pumps 18a and 18b flows into the inner tank 82 through a valve 84a, and the water is filtered by the microfiltration means 84.

In the microfiltration means 84, the pool water passes through an assembly of porous ceramic filters 20. The impurities in the pool water including oils and other organic impurities, metal salts and other inorganic particles, bacteria and other particles of the size as little as from about 0.25 to 1 μm are removed in the microfiltration means 84 by the porous ceramic filters 20.

A plurality of porous ceramic filters 20 that are capable of removing minute particles to the range of from about 0.25 to 1 μm are installed in the microfiltration means 84. Typical number of the porous ceramic filters 20 installed is in the range of from about 100 to about 150.

The type of the porous ceramic filters 20 used is not limited to any particular type, and any conventional filter of cylindrical configuration may be employed. However, it is most preferable to use the cylindrical porous ceramic filter disclosed in the copending U.S. patent application Ser. No. 07/931,403 (EPA . . . ), now U.S. Pat. No. 5,403,480, by the same applicant, that comprises a cylindrical porous ceramic filter having bored therethrough a plurality of axial through holes between its exterior and an interior surfaces. According to an embodiment of the use of this filter, the liquid to be filtered flows along the exterior surface of the cylindrical filter and through its central axial through hole along the interior surface of the cylindrical filter, and the filtered liquid flows through the plurality of axial holes bored between said exterior and said interior surfaces.

When such a ceramic filter is employed, the microfiltration means 84, and hence, the liquid purification system 10 will have a high filtration capability while the size of the system is significantly reduced.

Figure 3:
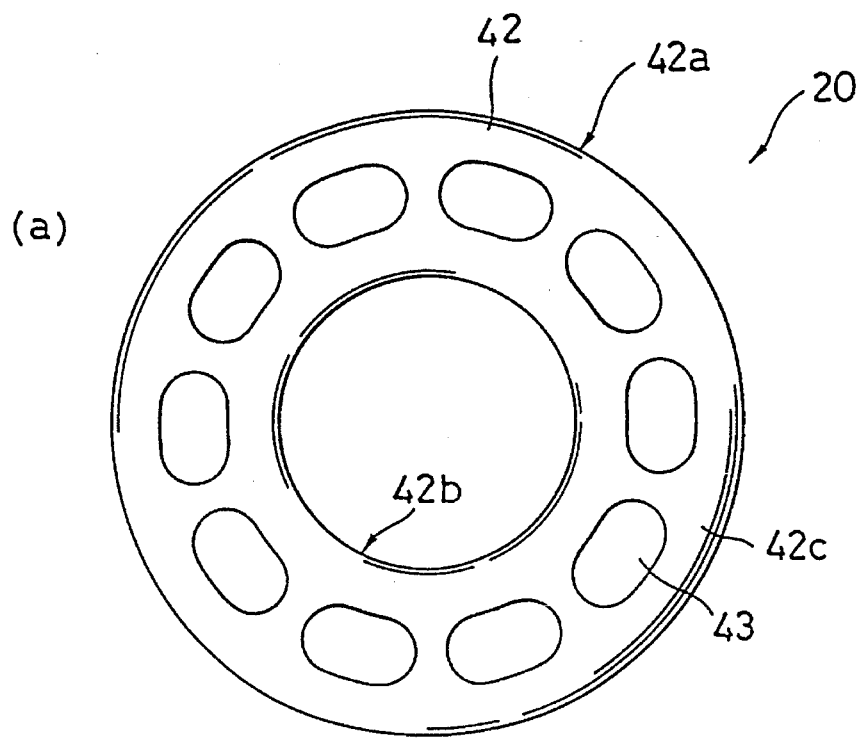
FIG. 3(a) is a top plan view of an embodiment of the porous ceramic filter used in the liquid purification system of the present invention.
FIG. 3(b) is a partial vertical cross sectional view of the porous ceramic filter shown in FIG. 3(a).
Figure 3:
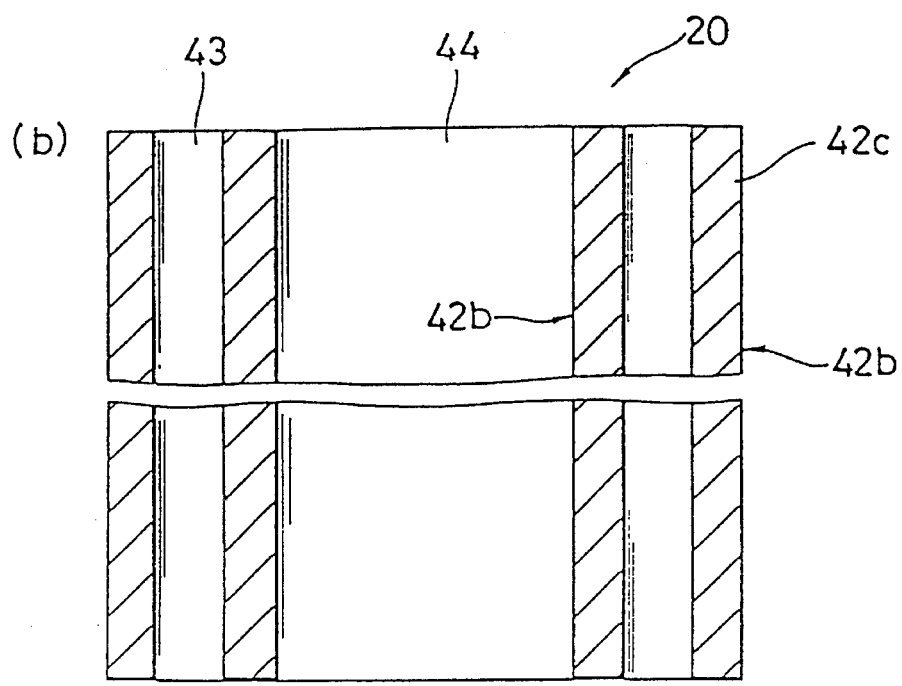

An embodiment of such porous ceramic filter 20 is illustrated in FIGS. 3(a) and 3(b) in its top plan view and vertical cross sectional view, respectively. The cylindrical porous ceramic filter 20 comprises a cylindrical body 42 having an exterior surface 42a and an interior surface 42b, that defines a central through hole 44. In the interior 42c of the cylindrical body 42, a plurality of axial through holes 43 are circumferentially aligned between the exterior and the interior surfaces 42a and 42b. In the embodiment shown in FIG. 3(a), ten through holes 43 each having an oblong cross section are bored through the cylindrical body 42, although the through holes 43 are not limited for their number or cross-sectional configuration to those of this embodiment.

In contrast to conventional ceramic filters which simply comprise a cylindrical body, the ceramic filter 20 has a plurality of through holes 43 axially bored through the interior 42c of the cylindrical body 42c so that the pool water that has been primarily filtered may flow through the through holes 43. Therefore, it would be efficient to use the ceramic filter 20 in accordance with one of the two alternative ways as described below.

(1) Both the exterior and the interior surfaces 42a and 42b of the cylindrical body 42 are preliminarily coated with a filter aid, and the pool water to be filtered is allowed to flow along the exterior surface 42a of the cylindrical body 42 and through the central through hole 44 along the interior surface 42b of the cylindrical body 42. The pool water brought in contact with the exterior and interior surfaces 42a and 42b of the cylindrical body 42 is filtered through the cylindrical body 42 and the filtered pool water is recovered from the axial through holes 43. A large volume of water can be treated when the porous ceramic filter 20 is used in this way.

(2) In another embodiment of the use of the porous ceramic filter 20, the filter aid is preliminarily coated on the exterior surface 42a of the cylindrical body 42, and on the interior surface of the axial through holes 43, in particular, on the side facing the interior surface 42b. The pool water to be filtered is allowed to flow along the exterior surface 42a of the cylindrical body 42, and the primarily filtered pool water is collected in the axial through holes 43. The primarily filtered water flowing through the axial through holes 43 is further filtered through the cylindrical body 42, and the secondarily filtered water of a higher purity is recovered from the central through hole 44. The degree of the purification may be significantly improved when the porous ceramic filter 20 is used in this way.

Other ceramic filters that may be preferably used in the microfiltration means 84 of the present invention include those shown in FIGS. 4, 11 to 17 of the copending U.S. patent application Ser. No. 07/931,403, now U.S. Pat. No. 5,405,480.

As shown in FIG. 2, the ceramic filters 20 as described above are serially connected to one another by a joint member 120. In the embodiment shown in FIG. 2, three ceramic filters 20 connected by two intervening joint members 120 are held between a cover 51 and a jacket 52 to constitute a filter assembly 50. Of cause, the number of the ceramic filters 20 in one filter assembly 50 is not limited to the one shown in FIG. 2. The filter assembly 50 is shown in further detail in FIGS. 4 (a), 4 (b), 5 (c), 5 (d) and 6.

Figure 4:
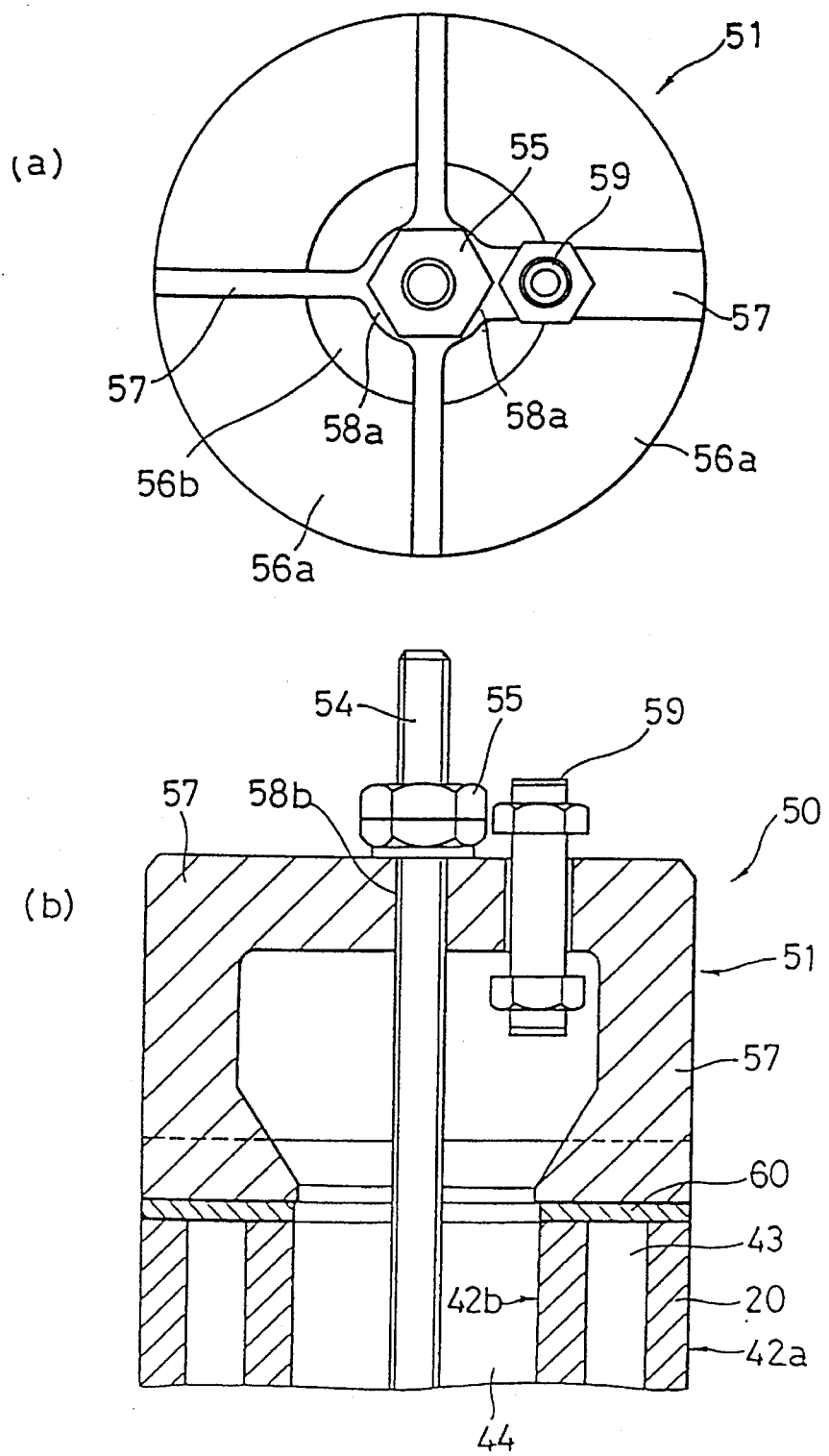
FIG. 4 (a) is a top plan view of an embodiment of the filter assembly used in the liquid purification system of the present invention.

In the embodiments shown in FIGS. 4 (a), 4 (b), 5 (c), 5(d) and 6, the filter assembly 50 comprises the cover 51, the jacket 52, the joint members 120, the ceramic filters 20, a stud 54 and a nut 55, the ceramic filters 20 being held between the cover 51 and the jacket 52 by the stud 54 and the nut 55.

As shown in FIGS. 4(a) and 4(b), the cover 51 comprises an annular disk 56a which has at its center an opening 56b of an inner diameter substantially equal to the diameter of the central through hole 44 of the ceramic filter 20. The annular disk 56a blocks the through holes 43 of the ceramic filter at their upper ends. The cover 51 also has four L-arms 57 arranged at an interval of about 90° which extend from the annular disk 56a and meet beyond the central opening 56b at its center. A support portion 58a is formed at the intersection of the arms 57, and an opening 58b is formed in the support portion 58a. The support portion 58a supports the stud 54 which is inserted through the opening 56b.

In the cover 51 shown in FIGS. 4(a) and (b), one of the four arms 57 is thicker than the remaining three arms 57, and a nozzle 59 is formed in the thicker arm 57 to enable washing of the central through hole 44 of the ceramic filter 20. The nozzle 59 has fixed thereon a onetouch coupler for shower washing. The cover 51 is secured to the upper end of the ceramic filter 20 with an intervening packing 60.

As shown in FIGS. 5(c) and 5(d), the jacket 52 comprises a jacket body 61 and a jacket cover 62. The jacket body 61 comprises a cylindrical body which has at its upper end a central hole 63 of an inner diameter substantially equal to the diameter of the central through hole 44 of the ceramic filter 20. The central hole 63 is blocked at its lower end, and at the bottom of the central hole 63 is formed a hole 61b with female thread into which the stud 54 is threaded.

In the upper portion of the jacket body 61, a plurality of communication holes 64 are formed in a direction diagonal to the axial direction to communicate interior of the central hole 63 and exterior of the jacket body 61 outside an exterior circumferential surface 61a. In the embodiment of FIGS. 5(c) and 5(d), ten communication holes 64 each having an oblong cross section are bored across the jacket body 61.

The jacket body 61 has also axially bored therethrough a plurality of through holes 65 which correspond to and communicate with the through holes 43 of the ceramic filter 20.

In the embodiment shown in FIGS. 5(c) and 5(d), the through holes 65 define flow paths for the pool water which has been filtered through the ceramic filter 20, and ten through holes 65 are provided to correspond to the ten axial through holes 43 of the porous ceramic filter 20. The through holes 65 are dilated at some distance below its upper end. The jacket body 61 is formed with a thread 67 at its lower end on its circumferential surface, and the thread 67 is in engagement with a thread 68 of the jacket cover 62 so that the jacket cover 62 is liquid-tightly secured to the lower end of the jacket body 61 to define a space 69 between the lower end of the jacket body 61 and the cover 62. An outlet port 70a in communication with the space 69 is formed on the lower side of the jacket cover 62 with a downward extension 70. As set forth above, the jacket body 61 of the embodiment shown in FIG. 5(d) has formed therethrough twenty holes, namely, the alternately formed ten communication holes 64 to discharge the pool water that has not been filtered through the ceramic filter 20 and ten through holes 65 to discharge the pool water that has been filtered through the ceramic filter 20.

The lower end of the ceramic filter 20 is secured to the jacket 52 with an intervening packing 71, a stainless steel ring 72, and a packing 73.

The packing 71, the stainless steel ring 72, and the packing 73 respectively have a cross section substantially the same as that of the ceramic filter 20 to thereby allow the plurality of the through holes 43 of the ceramic filter to communicate only with the through holes 65 of the jacket 52, and to allow the central through hole 44 of the ceramic filter 20 to communicate only with the central hole 63 of the jacket 52. Accordingly, contamination of the filtered pool water with the non-filtered water is avoided. Exemplary packings 60, 71 and 73 that may be employed include ordinary Viton packings and rubber packings such as various liquid packings made of a silicone, Teflon, a fluororubber, and the like.

As shown in FIG. 6, the joint member 120 comprises a first member 122 and a second member 124. The end portions of the first member 122 that is connected to the ceramic filter 20 has a structure the same as that of the second member 124, and the end portions of the first and the second members 122 and 124 are connected to the ceramic filter 20 in a manner similar to the connection of the porous ceramic filter 20 to the jacket 52. The first member 122 is provided at its lower end on its circumferential inner surface with a thread 123, which is in engagement with a thread 125 provided on the second member 125 at its upper end and on its circumferential exterior surface so that the first and second members 122 and 124 are liquid tightly secured to one another via an O ring or the like.

More illustratively, the first member 122 and the second member 124 respectively comprise a cylindrical body which is provided at the end connecting with the ceramic filter 20 with a central hole 126, which has a bottom and an inner diameter substantially the same as the central through hole 44 of the ceramic filter. A through hole 127 of an inner diameter substantially the same as the diameter of the stud 54 is bored through the bottom of the central hole 126 to receive the stud 54. The through hole 127 may have a thread on its surface.

A plurality of communication holes 128 are bored through the cylindrical body of the first or the second members 122 or 124 in a direction diagonal to the axis of the cylindrical body to communicate the interior of the central hole 126 and the exterior of the first or the second member 122 or 124. In the embodiment of FIG. 6, ten communication holes 128 having an oblong cross section are bored across the cylindrical body of the first or the second member 122 or 124.

The first and the second members 122 and 124 have also axially bored therethrough a plurality of through holes 130 between the central hole 126 and an exterior surfaces 122a or 124a. The axial through holes 130 correspond to the axial through holes 43 of the ceramic filter 20, and upon connection of the first and the second members 122 and 124 with the ceramic filter 20, interior of the axial through holes 130 is in communication with the interior of the axial through holes 43 of the ceramic filter 20. In the embodiment shown in FIG. 6, the axial through holes 130 define the flow paths of the filtered pool water, and ten through holes 130 are provided that are dilated at the end remote from the joint with the ceramic filter 20.

As described above, the first member 122 and the second member 124 are connected with one another by a thread 123 and a thread 125 respectively provided at their end portions on their circumference. At the end portion of the first member 122 and the second member 124, there are also provided a cylindrical extensions 122b and 124b which define a cylindrical groove 133 on their exterior side. Upon connection of the first member 122 and the second member 124, the cylindrical extensions 122b and 124b liquid tightly abut one another via an O ring or the like to define a space 132 which is in communication with the interior of each of the axial through holes 130.

The ceramic filter 20 is connected to the joint member 120 with an intervening packing 71, a stainless steel ring 72, and a packing 73 as in the case of the connection of the ceramic filter 20 to the jacket 52 shown in FIG. 5(c).

Since the porous ceramic filters 20 are connected as described above by the joint member 20 having the construction as described above, the filtered pool water flowing through the through holes 43 of the upper ceramic filter 20 flows through the through holes 130 of the first member 122, space 132, and the through holes 130 of the second member 125 to the through holes 43 of the lower ceramic filter 20 in this order as shown by arrow E in FIG. 6. On the other hand, the water which is not yet filtered flowing through the central hole 44 of the upper ceramic filter 20 flows through the central hole 126 of the first member 122, communication holes 128, the exterior of the exterior surface 122a, the exterior of the exterior surface 124a, communication holes 128 of the second member 124 and central hole 126 of the second member 124 to the central hole 44 of the lower ceramic filter 20 in this order as shown by arrow F in FIG. 6. As described above, the water flowing along the exterior surface of the ceramic filter 20 mixes with the water flowing through the interior through hole 44 of the ceramic filter 20, and the thus mixed water flows back to the interior through hole 44. The efficiency of the pool water filtration is thereby improved.

The filter assembly 50 is assembled by stacking the jacket 52, the packing 73, the stainless steel ring 72, the packing 71, and the ceramic filter 20 in this order from the bottom; connecting a plurality of ceramic filters 20 using the joint members 120 in the similar manner; inserting the stud 54 into the central hole 44 of the ceramic filter and threading the stud 54 into the threaded hole 61b at the bottom of the central hole 63 of the jacket 52; stacking the packing 60 and the cover 51 with the stud 54 extending through the central opening 58b and beyond the support portion 58a; and placing the nut 55 over the stud 54 that is extending beyond the support portion 58a of the cover 51; and tightening the nut 55 against the support portion 58 of the cover 51 to thereby complete the assembly of the filter assembly 50.

The cover 51 is not limited to the one shown in FIG. 4. The cover 51 may alternatively comprise a single disc with a central opening corresponding to the central through hole 44 of the ceramic filter 20. The jacket 52 may also have a structure other than the one described above. For example, the jacket body 61 and the jacket cover 62 may constitute an integral structure.

In the use of the filter assembly 50, various filter aid from the filter aid supply means 32 is preliminarily coated on the exterior surface 42a and on the interior surface 42b of the ceramic filter 20.

The pressurized pool water to be filtered introduced into the inner tank 82 from the valve 84b is introduced into the opening 56b of the cover 51. The water then flows through the central through hole 44 of the ceramic filter 20, where the water is brought into contact with the interior surface 42b of the ceramic filter at an elevated pressure in addition to the exterior surface 42a of the ceramic filter. The impurities in the pool water are adsorbed principally on the filter aid, and the water that passed through the filter aid layer is further filtered by the ceramic filter 20. The thus filtered pool water flows into the through holes 43 of the ceramic filters 20.

The filtered pool water in the through holes 43 of the ceramic filter 20 then flows through the through holes 65 and the space 69 of the jacket 52 to be discharged from the filter assembly 50 from the discharge port 70a of the jacket 52. The water then flows out of the microfiltration means 84.

In the meanwhile, the water in the central through. hole 44 of the ceramic filter 20 that failed to be filtered through the ceramic filter 20 flows into the central hole 62 of the jacket 52, and then, into the communication holes 64 of the jacket 52 from which the water is discharged from the filter assembly 50. The thus discharged non-filtered pool water is again subjected to the filtration.

In the backwashing of the filter assembly 50 by the backwash means 28 which will be described later, a gas-liquid two-phase water jet is introduced into the through holes 43 of the ceramic filter 20 from the discharge port 70a of the jacket 52, and through the space 69 and the through holes 65 of the jacket 52. The thus introduced water jet spouts from the exterior surface 42a and the interior surface 42b of the ceramic filter 20 to blow away the filter aid that had been preliminarily coated thereon together with the impurities adsorbed on the filter aid.

After the backwashing, the outer surface 42a of the ceramic filter 20 is washed by injecting water from the nozzle provided in the inner tank 82. The inner surface 42b of the ceramic filter 20 is washed by connecting a hose to the one-touch coupler of the nozzle 59 and injecting water from the nozzle 59. The water used for washing the central through hole 44 of the ceramic filter 20 is discharged from the filter assembly 50 through central hole 63 and the communication holes 64 of the jacket.

As described above, the filter assembly 50 of the present invention enables a smooth filtration of a large volume of the pool water as well as a smooth backwashing of the ceramic filter 20.

In the liquid purification system 10 shown in FIG. 2, the pool water that has been filtered through the ceramic filters 20 is collected in the liquid collection means 88 via valves 84b, and then flows to the disinfection means 90.

The disinfection means 90 is provided to kill or attenuate bacteria such as *E. coli* and *S. aureus* as well as viruses present in the pool water. In the disinfection means 90, an ozone lamp and an ultraviolet lamp are accommodated in a transparent quarts glass tube. The filtered pool water is disinfected as it circulates around the quarts glass tube. In addition, dry air is supplied into the quarts glass tube to generate ozone by means of the ozone lamp and the UV lamp, and the air containing the thus evolved ozone is bubbled into the pool water so as to agitate it and form small bubbles of ozone, which effectively sanitize the pool water by ozone oxidation. As will be described below, the pool water is usually disinfected with chlorine. The disinfection with UV ray and ozone which is performed in the disinfection means 90 will further enhance the effectiveness of the chlorine agent added to the pool water.

The pool water disinfected by the disinfection means 90 then flows into the outer tank 80 where an ultraviolet lamp 92 and the adsorption means 86 are accommodated.

In the embodiment of FIG. 2, the UV lamp 92 is accommodated near the upper end of the outer tank 80, and the adsorption means 86 mainly comprising an adsorption layer occupies the main part of the outer tank 80.

The pool water that had flown into the outer tank 80 from its upper end via a valve 90a is again disinfected by the UV ray irradiated by the UV lamp 92, and then flows into the adsorption means 86.

The adsorption layer of the adsorption means 86 is packed with adsorbents such as zeolite and activated carbon. In this layer, ammonia resulting from human sweat and urine, bacterial cells decomposed by the disinfection means 90 and the UV lamp 92, colorants, complex of the chlorine with other materials that are still contained in the pool water that had been filtered and disinfected are removed by the adsorption action of the adsorbents.

Any adsorbent can be used as long as it generates no biologically harmful substance that is soluble in the pool water, and preferred examples are zeolite, activated carbon and silica gel. Zeolite is capable of selectively adsorbing ammonia whereas activated carbon is capable of selectively adsorbing odor components, colorants and the chlorine complexes in the pool water.

The pool water that had been treated by the adsorption means 86 flow out of the inner tank 82 from the bottom of the system body 10a and flows into the ultrafiltration means 22 via a valve 86a.

In the embodiment of the liquid purification system 10 shown in FIG. 2, the disinfection means 90, wherein the filtered water is treated by the ozone and the UV ray, is separately provided from the system body 10a wherein the filtering means 84, the UV lamp 92, and the adsorption means 86 are accommodated. The system of the present invention is not limited to such an embodiment. For example, the disinfection means 90 does not have to be separately provided from the system body 10a, and the outer tank 80 may have accommodated therein an ozone generator, a bubbler for the ozone-containing air, and the like in addition to the UV lamp 92 so that the filtered water may be treated with the ozone and the UV ray as in the case of the separately provided disinfection means 90. Alternatively, the UV lamp provided in the outer tank 80 may be omitted when the disinfection means 90 is separately provided as in the embodiment shown in FIG. 2. It is also possible to omit the disinfection means 90 and treat the filtered water only by the UV lamp 92.

In the embodiment of the liquid purification system 10 shown in FIG. 2, the microfiltration means 84 is accommodated in the inner tank 82 and the adsorption means 86 is accommodated in the outer tank 80 together with the UV lamp 92. The present invention is not limited to such an embodiment. For example, the disinfection means 90 (or the UV lamp 92) and the adsorption means 86 may be provided in the inner tank 82 and the microfiltration means 84 may be provided in the outer tank 80. Alternatively, the liquid purifying system 10 may be divided into upper and lower compartments to provide the microfiltration means 84 in the upper compartment and the disinfection means 90 (or the UV lamp 92) and the adsorption means 86 in the lower compartment, or vice versa.

It is to be noted that the disinfection means 90 or the UV lamp 92 may be arranged with the microfiltration means 84 in the same tank although they are arranged with the adsorption means 86 in the embodiment shown in FIG. 2.

It should be also noted that the liquid purification system 10 shown in FIG. 2 may be installed in a direction vertically opposite to the direction shown in FIG. 2.

In the liquid purification system 10, the microfiltration means 84, the disinfection means 90 (and/or 92), and the adsorption means 94 may constitute removable units respectively, or alternatively, in combination of two or more, so that they may be replaced as a unit.

The filter assemblies 50 of the microfiltration means 84 may each constitute a replaceable unit, or alternatively, several filter assemblies 50 may constitute one replaceable unit.

The filter assemblies 50 may be arranged in horizontally or vertically divided compartments, and upon replacement of the filter assemblies 50, the filter assemblies 50 in one compartment may be replaced as a unit.

Next, the pool water of high purity that had been treated in the liquid purification system 10 flows into the ultrafiltration means 22 where the water is further purified before returning to the pool 12.

The ultrafiltration means 22 is provided to separate and remove viruses such as AIDS virus, influenza virus, Japanese B encephalitis virus, and hepatitis virus; proteins, and the like that are too small to be removed by the ceramic filters 20. A large number of ultrafiltration membranes such as hollow fiber membranes are accommodated in the ultrafiltration means 22.

Among various impurities that have originated from human body and other sources that may contaminate the pool water, those impurity particles having a diameter of about 0.2 to 0.5 µm and above as exemplified by bacteria including *E. coli, V. cholerae, S. typhi* and *P. aeruginosa* can be removed by the porous ceramic filters 20. The impurity particles of smaller sizes, however, cannot be effectively removed by the porous ceramic filters 20.

In the ultrafiltration means 22, ultrafiltration membranes such as hollow fiber membranes are employed to trap the particles of smaller sizes in the range of from 0.001 to 0.2 µm that are remaining in the pool water. Such particles adapted to be removed in the ultrafiltration means 22 include proteins (typically 0.002 to 0.01 µm), viruses (typically 0.01 to 0.2 µm), and bacteria that failed to be completely removed by the ceramic filters (typically 0.2–0.5 µm). However, the molecules and ions that are necessary for the pool water such as metal ions (e.g. $Na^+$) and anions (e.g. $Cl^-$) will simply pass through the ultrafiltration membrane without being trapped.

It has been impossible to treat a large volume of pool water by using a filter with the pores as small as those of the ultrafiltration membrane due to the clogging of the pores that might occur soon after the initiation of the ultrafiltration. However, in the embodiment shown in FIG. 1, the pool water has been preliminarily microfiltered by the porous ceramic filters 20 to thereby enable ultrafiltration of a large volume of pool water.

The ultrafiltration membrane to be used in the present invention is not limited to any particular type and various known ultrafiltration membranes such as hollow fiber membranes may be used, with Kuraray UF filter of Kuraray Co., Ltd. being mentioned as a typical example.

The hollow fiber membrane may be of the type that permits ultrafiltration from its outside to the inside or of the type that permits ultrafiltration in reverse direction.

In the ultrafiltration means 22, the ultrafiltration membranes are used in combination with an ultrasonic wave generator. The ultrasonic wave generator to be used in the present invention is not limited to any particular type, and various types of the ultrasonic wave generator that are capable of applying ultrasonic waves to the ultrafiltration membranes may be employed, as exemplified by an ultrasonic vibrating plate that is placed around the entire circumference of the ultrafiltration unit or a plurality of ultrasonic vibrating plates that are spaced around the ultrafiltration unit at a predetermined interval.

In the embodiment shown in FIG. 1, the ultrafiltration means 22 is arranged in the downstream of the liquid purification system 10 of the present invention. However, the ultrafiltration means 22 may be otherwise arranged, for example, between the water collection means 88 and the disinfection means 90 in the liquid purification system 10.

As mentioned above, the liquid purification system shown in FIG. 1 is provided with the filter aid supplying means 32 that not only assists the filtration of the pool water and prevents the ceramic filter 20 from clogging but also facilitates the backwashing of the ceramic filter 20.

The filter aid supplying means 32 accommodates the filter aid that is used for forming a layer of the filter aid on the porous ceramic filters 20. The filter aid layer maintain the filtering performance of the ceramic filters 20 in the liquid purification system 10 (the microfiltration means 84) at a satisfactory level, and facilitates the cleaning of the ceramic filters 20. The filter aid in the filter aid supplying means 32 is fed to the ceramic filters 20 in the liquid purification system 10 by the slurry pump 34.

The filter aid is used to prevent the clogging of the porous ceramic filter 20 which has numerous minute pores. The porous ceramic filter 20 is easily clogged if the pool water were directly applied thereto in the absence of such a layer of the filter aid to undergo a rapid decrease in its filtration capacity to render the filtration impossible. This is the reason why the porous ceramic filters are used with the readily removable layer of the filter aid formed on its upstream surface.

Preferred filter aids are those in powder form such as diatomaceous earth and lime; those in fibrous form such as cellulose, pulp fibers and asbestos; and silica gel which is capable of selectively adsorbing proteins. In a preferred embodiment, the porous ceramic filter 20 is covered on its upstream side with a release layer of a powder filter aid that can be readily removed; and the thus formed release layer is overcoated with a layer of a fibrous filter aid and a layer of silica gel.

Although the liquid purification system 10 and the filter aid supplying means 32 are separately arranged in the embodiment of FIG. 1, it is preferable to arrange the filter aid supplying means 32 beside the cylindrical liquid purification system 10 as shown in FIG. 7, by designing the filter aid supplying means 32 to have a configuration that correspond to the cylindrical configuration of the liquid purification system 10. Such an arrangement will miniaturize the system and save the installation space.

The system shown in FIG. 1 is also provided with a backwash means 28 for cleaning the ceramic filters 20 of the liquid purification system 10 (the microfiltration system 84) and the backwash means 30 for cleaning the ultrafiltration membranes of the ultrafiltration means 22.

The porous ceramic filter 20 is periodically washed by using the backwash means 28 to maintain the filtration efficiency of the porous ceramic filter 20 at a satisfactory level. Preferably, the backwashing of the porous ceramic filter 20 is periodically carried out before it undergoes a decrease in its filtration efficiency. In the backwashing of the porous ceramic filter 20, a water jet comprising a stream high pressure air mixed with a cleaning water is passed through the porous ceramic filter in a direction reverse to that of the filtration so that the dust particles deposited on and in the filter aid layer can be removed together with the filter aid layer and the porous ceramic filter itself can be cleaned by the water jet. Accordingly, the backwash means 28 comprises a water tank, a high pressure air source, a circulating path for accelerating said water used for the backwashing, and a mixing means for mixing the high pressure air and the accelerated water (not shown). The backwash means 28 is not limited to such a constitution.

The backwash means 30 for the ultrafiltration means 22 prevents drop in the filtering efficiency of the ultrafiltration membranes, to thereby maintain the operation efficiency at a high level. The backwash means 30 also reduces frequency of the replacement of the expensive ultrafiltration membranes. The backwashing means 30 comprises a tank for supplying the water used for backwashing, a pump 34 and an ultrasonic wave generator connected to a drive source (not shown).

The backwashing of the ultrafiltration means 22 is carried out by supplying the water in the tank to the ultrafiltration means 22 from its outlet in a direction reverse to that of the ultrafiltration so that the water may flow from the interior to the exterior of the ultrafiltration membranes to dislodge the particles of impurities that had been trapped on the ultrafiltration membranes. The water used for such backwashing is discharged from ultrafiltration means 22 with the dislodged impurity particles.

During this backwashing cycle, the ultrasonic wave generator generates ultrasonic waves that are applied toward the center of the ultrafiltration means 22, so that the ultrafiltration membranes are vibrated to facilitate the dislodging of the trapped fine impurity particles, thereby enhancing the efficiency of the backwashing operation.

In the liquid purification system that has a construction as shown in FIG. 1, the pool water that had overflown the pool 12 flows into the overflow tank 14, and contaminants of a considerably large size are removed by the prefilters 16a and 16b that may typically be carbon filters. The pool water is then fed to the liquid purification system 10 of the present invention by the pumps 18a and 18b.

In the liquid purification system 10, the pool water passes through the valve 84a and flows into the microfiltration means 84 accommodated in the inner tank 82 where the pool water is filtered through the porous ceramic filters 20. The thus filtered pool water flows out of the inner tank, and flows through the valve 84b to be collected by the water collection means 88 before being fed to the disinfection means 90. In the disinfection means 90, the filtered pool water is disinfected by UV ray and ozone. The thus disinfected pool water then passes through the valve 90a and flows into the outer tank 80 where the UV lamp 92 and the adsorption means 86 are accommodated. In the outer tank 80, the pool water is additionally disinfected by the UV lamp 92 and then flows into the adsorption layer of the adsorption means 86 where odor substances such as ammonia as well as bacteria and viruses killed by the disinfection means 90 (and the UV lamp 92) are adsorbed onto the adsorbent such as activated carbon. The thus purified pool water flow out of the liquid purification system 10.

The pool water that had been highly purified in the liquid purification system 10 passes through the valve 86a and flows into the ultrafiltration means 22 where it is subjected to ultrafiltration. The highly purified pool water is then returned to the pool 12.

The applicant of the present invention have proposed in U.S. Pat. No. 5,244,585 a pool water purification system of a one-unit arrangement wherein a disinfection means utilizing UV ray and ozone, an adsorption means and a microfiltration means utilizing a porous ceramic filter are concentrically arranged in this order from the inside to the outside. The U.S. Pat. No. 5,244,585 also discloses a pool water purification system wherein an ultrafiltration means is provided between the disinfection means and the adsorption means.

The porous ceramic filter used in U.S. Pat. No. 5,244,585, however, is a custom-made ceramic filter of a quite large diameter, and accordingly, very expensive.

On the other hand, the porous ceramic filters used in the liquid purification system of the present invention is not limited to any particular type, and any known or commercially available porous ceramic filters can be used as long as they can be accommodated in the inner or outer tank of the liquid purification system. Therefore, the liquid purification system of the present invention can be produced at a significantly lower cost. Also, the replacement of the porous ceramic filter can be readily carried out at far more less cost.

In the foregoing description of the liquid purification system of the present invention, the porous filter used in the microfiltration system was a porous ceramic filter. The porous filter that may be used in the present system, however, is not limited to such porous ceramic filter, and other filters made of different materials may be used as long as they are abundant in very minute three-dimensional pores that can trap minute particles such as bacteria and oil components secreted by human body as in the case of the porous ceramic filter. Also, the size of the pores in the porous filter, is not limited to any particular range, and a porous filter with an adequate pore size may be selected in accordance with the particle size of the impurities that should be removed from the liquid. Exemplary other porous filters include filters produced by compressing fibrous materials having a three-dimensional structure such as compressed stainless steel piles, compressed metal piles, compressed carbon fibers; sintered metals; compressed resin beads; and other porous filters of different materials.

Furthermore, in the foregoing description, the liquid purification system of the present invention has been described for the case of the pool water purification. The liquid purification system of the present invention is not limited to such a pool water purification system, and any liquid purification system that purifies a liquid that should undergo filtration, disinfection, and adsorption is within the scope of the present invention. The liquids that may be purified by the liquid purification system of the present invention include drinking water, juice and other beverages, beer and other alcoholic beverages, liquid sauces, medical liquids, and other liquids that are to be taken by a human; industrial water, industrial alcohols and other liquids that are used in various industries; industrial waste water and primarily and secondarily treated waste waters; rain water and water from sea, river or lake; and the like.

While the liquid purification system of the present invention has been described in detail with reference to the preferred embodiments, it should be understood that various improvements and modifications can be made without departing from the spirit and scope of the invention as recited in the appended claims.

As set forth above, the liquid purification system of the present invention has a double-tank structure comprising an inner tank and an outer tank so that the microfiltration means, the disinfection means and the adsorption means, that had been separately arranged in conventional systems, may be integrally arranged in the double-tank structure in one unit. More illustratively, in the liquid purification system of the present invention, either one of the microfiltration means and the adsorption means is accommodated is in the inner tank, and the microfiltration means or the adsorption means that is not accommodated in the inner tank is accommodated in the outer tank, with the disinfection system being provided on the liquid line communicating the inner and the outer tanks. Since the liquid purification system of the present invention has such an arrangement, the system is quite compact in size to facilitate an easy installation and maintenance at low cost while various performances required for a liquid purification system are fully satisfied. Therefore, the liquid purification system of the present invention is quite adequate for purifying pool water as well as other liquids such as drinking water, beverages, alcoholic beverages, sauces and other liquids that are to be taken by a human; industrial water and other industrial liquids; industrial waste water and other waste waters; rain water and water from river, lake or sea; and the like.

I claim:

1. A system for purifying a liquid by a microfiltration means, a disinfection means, and an adsorption means, comprising;

an inner tank, said inner tank having accommodated therein either one of said microfiltration means or said adsorption means;

an outer tank concentrically surrounding said inner tank, said outer tank having accommodated therein outside said inner tank the one of said microfiltration means or adsorption means that is not accommodated in said inner tank; and a fluid line connecting said microfiltration means and said adsorption means, said fluid line having provided thereon said disinfection means.

2. The system according to claim 1 wherein said disinfection means is arranged in said outer tank at its top or bottom portion where said either one of said microfiltration means or said adsorption means in said outer tank is not accommodated.

3. The system according to claim 1 wherein said fluid line connecting said microfiltration means and said adsorption means passes outside said tanks, and said disinfection means is arranged in said line outside said tanks.

4. The system according to claim 1 wherein said fluid line connecting said microfiltration means and said adsorption means passes outside said tanks, and said disinfection means is arranged both in said outer tank at its top or bottom portion where said at least one of said microfiltration means is not accommodated, and in said line outside the tanks.

5. The system according to claim 1 wherein said microfiltration means utilizes a cylindrical porous ceramic filter for the filtration, said adsorption means utilizes activated carbon as at least one means for the adsorption, and said disinfection means utilizes ultraviolet ray as at least one means for the disinfection.

6. The system according to claim 5 wherein said porous ceramic filter is a cylindrical porous ceramic filter having an exterior surface and an interior surface; a central through hole is axially defined by said interior surface; and a plurality of circumferentially aligned through holes are axially bored through said cylindrical filter between said exterior and said interior surfaces; and the liquid to be filtered flows outside the cylindrical filter along said exterior surface and inside the cylindrical filter through said central through hole along said interior surface, and the liquid that has been filtered through said cylindrical filter flows through the plurality of through holes axially bored between said exterior and said interior surfaces.

7. The system according to claim 1 further comprising an ultrafiltration means that is provided between said microfiltration means and said disinfection means.

8. The system according to claim 1 wherein the liquid purified in the liquid purification system is pool water.

\* \* \* \* \*